(12) United States Patent
Gao

(10) Patent No.: US 9,822,690 B2
(45) Date of Patent: Nov. 21, 2017

(54) EXHAUSTION PIPE

(71) Applicant: NINGBO GNS AUTO PARTS CO., LTD., Ningbo (CN)

(72) Inventor: Qiang Gao, Ningbo (CN)

(73) Assignee: NINGBO GNS AUTO PARTS CO., LTD., Ningbo (CN)

( * ) Notice: Subject to any disclaimer, the term of this patent is extended or adjusted under 35 U.S.C. 154(b) by 0 days.

(21) Appl. No.: 15/071,223

(22) Filed: Mar. 16, 2016

(65) Prior Publication Data
US 2017/0204772 A1     Jul. 20, 2017

(30) Foreign Application Priority Data

Jan. 19, 2016   (CN) .......................... 2016 1 0034094

(51) Int. Cl.
*F01N 3/02*     (2006.01)
*F01N 13/08*    (2010.01)

(52) U.S. Cl.
CPC ................................. *F01N 13/082* (2013.01)

(58) Field of Classification Search
USPC ......... 60/272, 289, 293, 298, 304, 307, 317, 60/318, 319, 320, 324
See application file for complete search history.

(56) References Cited

U.S. PATENT DOCUMENTS

| | | | | |
|---|---|---|---|---|
| 2,055,453 A | * | 9/1936 | Horton | F01N 1/00 181/262 |
| 4,471,853 A | * | 9/1984 | Callaghan | B60K 13/04 180/309 |
| 4,487,289 A | * | 12/1984 | Kicinski | F01N 1/08 181/252 |
| 6,748,736 B1 | * | 6/2004 | Claverie | F01N 1/084 60/298 |
| 8,056,327 B2 | * | 11/2011 | Brown | F01N 3/02 181/239 |
| 8,468,811 B2 | * | 6/2013 | Smith | F01N 13/082 60/317 |
| 8,661,798 B2 | * | 3/2014 | Prather | F01N 3/05 60/317 |
| 2010/0107616 A1 | * | 5/2010 | Janakiraman | F01N 3/05 60/317 |

FOREIGN PATENT DOCUMENTS

| | | |
|---|---|---|
| CN | 203822436 U | 9/2014 |
| CN | 104481660 A | 4/2015 |
| CN | 104564291 A | 4/2015 |

* cited by examiner

*Primary Examiner* — Binh Q Tran
(74) *Attorney, Agent, or Firm* — Gokalp Bayramoglu

(57) ABSTRACT

The present invention provides an exhaustion pipe in the mechanical field. The exhaustion pipe of the invention comprises a casing, on the sidewall of which a plurality of ventilation through holes are provided; and a cooling pipe mounted within the housing, which includes a heat dissipative air inlet end and a heat dissipative air outlet end, and on the sidewall of which a plurality of heart dissipative ventilation holes are provided. The exhaustion pipe has advantages including a simple structure, a rapid cooling effect and good safety performance.

8 Claims, 5 Drawing Sheets

A-A

EXHAUSTION PIPE

BACKGROUND OF THE INVENTION

Field of Invention

The present invention relates to an exhaustion pipe in the mechanical field.

Related Art

The exhaustion system refers to a system for collecting and discharging exhaust gas, including an exhaust manifold, an exhaustion pipe, a hush pipe and a resonator. The exhaustion pipe is one of the important parts of the exhaustion system. The exhaust gas has a large amount of heat. Not only does the exhaust gas discharged have a high temperature, but also the heat of the exhaust gas is transferred to the exhaustion pipe, for which the exhaustion pipe will keep having a high temperature. To this end, vehicles and persons behind the exhaustion pipe will be put in a dangerous position.

The exhaustion pipes available on the market simply discharge the exhaust gas to the atmosphere. The temperature of the exhaust gas and the exhaustion pipe is higher than normal discharge temperature, which brings a higher risk.

For example, in Chinese patent publication CN104564291A, the gas discharge space of the exhaustion pipes is added by increasing the number of channels of the exhaustion pipe, which is complicated in production and mounting. Even though heat dissipation is achieved, the production cost is increased. Such an exhaustion pipe could not achieve a good heat dissipation effect within a short time period as external air could not enter into the pipe. And after being continuously sued, the heat dissipation efficiency of the exhaustion pipe is greatly decreased, for which the discharge temperature requirement could not be obtained.

For example, in Chinese patent CN203822436U, a number of coolers are added to the exhaustion pipe. Such an exhaustion pipe has a larger number of components and a complicated configuration. The coolers are transversely mounted in the exhaustion pipe by being transverse (i.e., substantially perpendicular) to the exhaust tailpipes. The air and the exhaust gas are evenly mixed, which nevertheless could hinder discharge of the exhaust gas and is not suitable for large-power exhaust gas discharge.

For example, in Chinese patent publication CN104481660A, a heat dissipation layer is added to the outer side the exhaustion pipe and on the outer sidewall of the exhaustion pipe. The heat dissipation layer is of a high cost and tends to be damaged for being mounted on the outer side. The heat dissipation efficiency of the exhaust gas within the exhaustion pipe is largely decreased and the discharge temperature requirement could not be met.

To sum up, an exhaustion pipe having a simple configuration, a fast heat dissipative effect and safe performance, is required to address the shortcomings of configuration of the exhaustion pipe.

SUMMARY OF THE INVENTION

In order to address the aforesaid defects, the present invention provides an exhaustion pipe having a simple structure, rapid heat dissipation and good safety performance.

It is therefore an object of the present invention to provide an exhaustion pipe comprising:
  a casing, on the sidewall of which a plurality of ventilation through holes 11 are provided; and
  a cooling pipe mounted within the housing, which includes a heat dissipative air inlet end and a heat dissipative air outlet end, and on the sidewall of which a plurality of heat dissipative ventilation holes are provided.

In the exhaustion pipe according to an embodiment of the invention, an edge of each of the heat dissipative ventilation holes extends to the interior of the cooling pipe to form an air deflector which forms a ventilation opening together with the heat dissipative ventilation hole.

In the exhaustion pipe according to an embodiment of the invention, the heat dissipative ventilation holes are of a semi-circular shape, and the air deflectors are fixedly connected with an arc edge of the heat dissipative ventilation holes.

In the exhaustion pipe according to an embodiment of the invention, the air deflectors are tilted toward the heat dissipative air outlet end.

In the exhaustion pipe according to an embodiment of the invention, each of the air deflectors includes an air guide side which is configured as an arc concave face.

In the exhaustion pipe according to an embodiment of the invention, the casing includes a connecting tail pipe and a heat dissipative tail pipe, and the cooling pipe is fixedly connected with the connecting tail pipe and inserted into the heat dissipative tail pipe.

In the exhaustion pipe according to an embodiment of the invention, the cooling pipe, the connecting tail pipe and the heat dissipative tail pipe are all configured as a hollow cylinder, and the diameter of the connecting tail pipe is smaller than that of the heat dissipative tail pipe.

In the exhaustion pipe according to an embodiment of the invention, the end of the heat dissipative tail pipe at the exhaustion direction is an oblique surface.

In the exhaustion pipe according to an embodiment of the invention, the casing further includes a connecting element mounted between the connecting tail pipe and the heat dissipative tail pipe, the connecting element is configured as a round table and the ventilation through holes are provided on the outer sidewall of the connecting element.

In the exhaustion pipe according to an embodiment of the invention, the cooling pipe, the connecting tail pipe, the heat dissipative tail pipe and the connecting element are all coaxially disposed.

Compared with the prior art, the exhaustion pipe of the invention has a simple structure, in which the exhaust as enters the heat dissipative air inlet end through the connecting tail pipe and then enters into the cooling pipe. Air enters into the casing through the ventilation through holes and follows within the casing. The heat dissipative ventilation holes are provided on the cooling pipe, and the air within the casing is drawn into the cooling pipe to be mixed with the exhaust gas when the exhaust gas is discharged at a high speed, for which the temperature of the exhaust gas is dramatically decreased and the air within the casing is continuously transferred into the cooling pipe through the ventilation through holes. Therefore, the exhaustion pipe of the invention could be cooled rapidly. Meanwhile, the air deflectors are tilted toward the heat dissipative air outlet end. Consequently, the air entering into the cooling pipe from the casing is led by the air deflectors to the air outlet end of the cooling pipe, which provides a good cooling effect and good safety performance. The exhaustion pipe of the invention is convenient for large-scale production.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Embodiments of the present invention will be described in detail below with reference to the drawings. However, the present invention shall not be limited to these embodiments.

Figure 1:
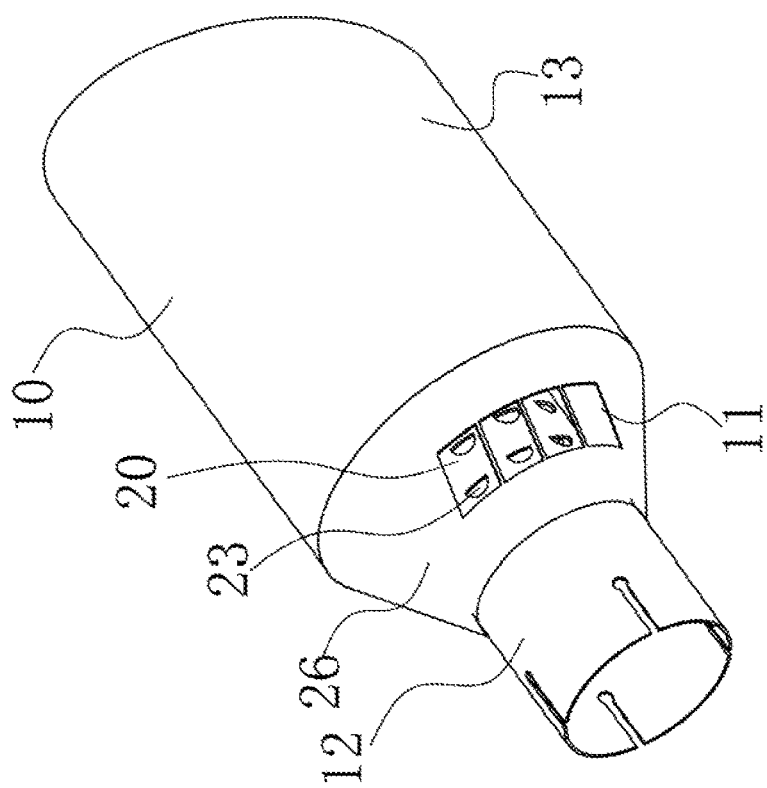
FIG. 1 is a diagram of a preferred embodiment of the invention.
Figure 2:
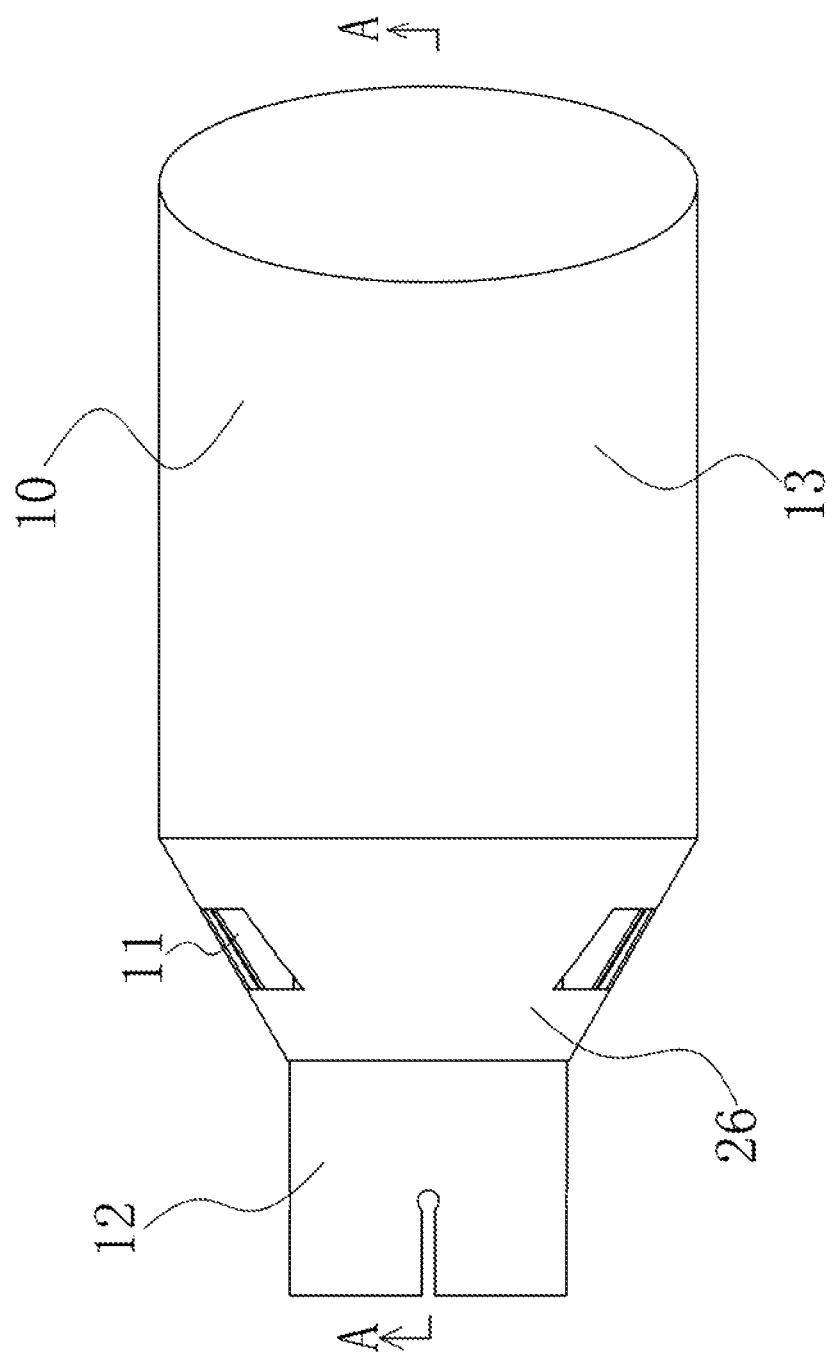
FIG. 2 is a front view of a preferred embodiment of the invention.

As shown in FIGS. 1 and 2, the exhaustion pipe of the invention comprises:

a casing 10, on the sidewall of which a plurality of ventilation through holes 11 are provided; and a cooling pipe 20 mounted within the housing 10, which includes a heat dissipative air inlet end 21 and a heat dissipative air outlet end 22, and on the sidewall of which a plurality of heat dissipative ventilation holes 23 are provided.

The exhaustion pipe of the invention has a simple configuration and is adapted for large-scale production. The solid arrow direction in the figures indicates the air flow direction. The external air enters into the casing 10 via the ventilation through holes 11, flows within the casing 10, and then enters into the cooling pipe 20 via the heat dissipative ventilation holes 23 to mix with the exhaust gas for cooling purposes. The hollow arrow direction indicates the exhaust gas flow direction. The exhaust gas enters from the heat dissipative air inlet end 21 and is discharged from the heat dissipative air outlet end 22.

As the exhaust gas flows at a high speed within the cooling pipe 20 and draws strong attraction to the air within the casing 10, the air within the casing 10 is drawn into the cooling pipe 20 via heat dissipative ventilation holes and mixed with the exhaust gas. The temperature of the exhaust gas is decreased abruptly. The air within the casing 10 is continuously transferred to the cooling pipe 20 through the ventilation through holes 11. As such, the exhaustion pipe of the invention could achieve first cooling.

In a preferred embodiment, the edge of the heat dissipative ventilation hole 23 extends to the interior of the cooling pipe 20 to form an air deflector 24 which forms a ventilation opening 25 together with the heat dissipative ventilation hole 23.

The air within the casing 10 enters into the cooling pipe 20 through the heat dissipative ventilation holes 23. The air deflector 24 is configured to guide the air, so that the air enters into the cooling pipe 20 through the ventilation openings 25.

Figure 3:
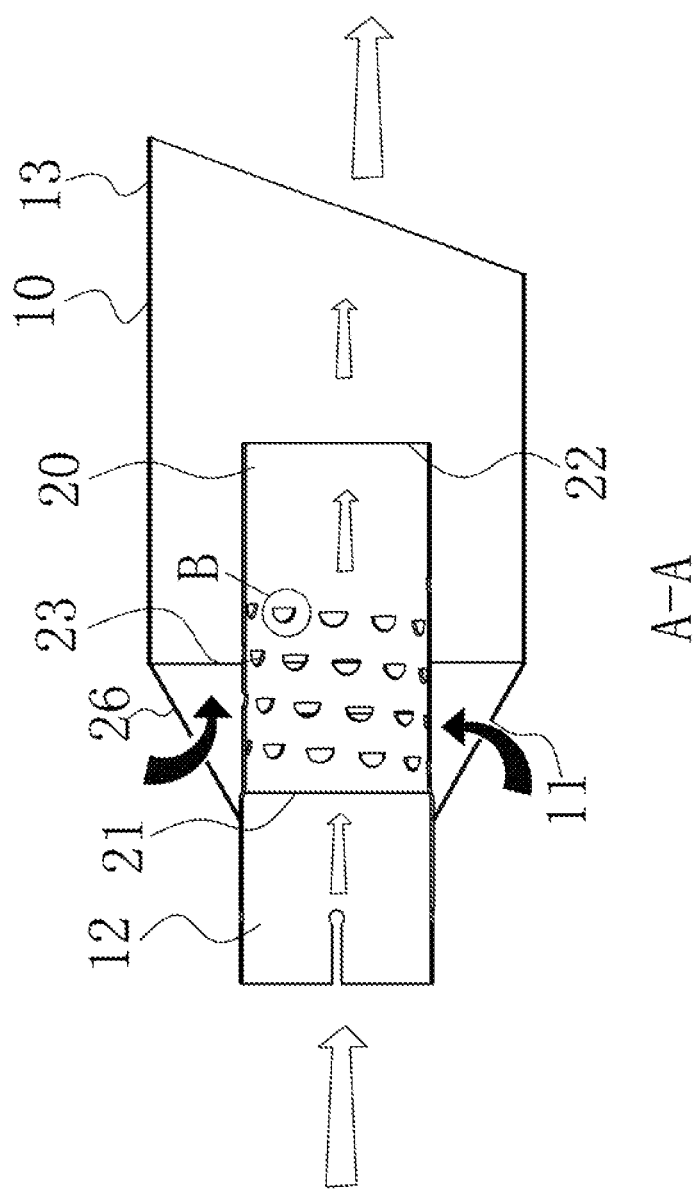
FIG. 3 is an enlarged view of the A-A portion.

In a preferred embodiment, as shown in FIG. 3, the heat dissipative ventilation holes 23 are of a semi-circular shape. The air deflectors 24 are fixedly connected with the arc edge of the heat dissipative ventilation holes 23.

There could be various shapes of the heat dissipative ventilation holes 23, for example a triangular or square shape, as long as air could pass through these holes. Preferably, the heat dissipative ventilation holes 23 are semi-circular and the arc edges of the heat dissipative ventilation holes 23 are connected with the air deflectors 24. The connection part of the air deflector 24 with the heat dissipative ventilation hole 23 has a smooth-curve transition, for which the air could enter into the cooling pipe 20 via the ventilation openings in a more convenient manner.

Figure 4:
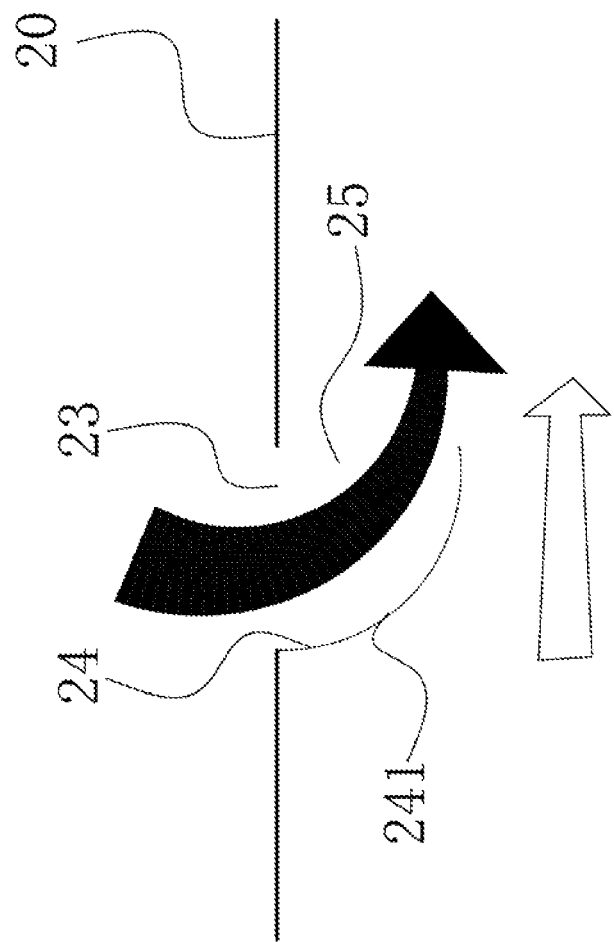
FIG. 4 is an enlarged view of the portion B of FIG. 3.

In a further preferred embodiment, as shown in FIG. 4, the air deflectors 24 are tilted toward the heat dissipative air outlet end 22.

The casing 10 is filled with air and the ventilation through holes 11 are continuously supplied with external air. The air deflector 24 are obliquely disposed and tilted toward the heat dissipative air outlet end 22. The cooling pipe 20 is in communication with the casing 10 through the ventilation openings 25. The attraction brought by high-speed exhaust gas transfer draws air within the casing 10 into the cooling pipe through the ventilation openings 25. As such, the direction of transmission of the inhaled air is the same as that of the exhaust gas. The direction of transmission of the air from the casing 10 to the cooling pipe 20 is led by the air deflectors 24 to the air outlet end of the cooling pipe 20, so that reflux is prevented and temperature is quickly decreased.

In a further preferred embodiment, the air deflector 24 includes an air guide side 241 which is configured as an arc concave face.

The air guide side 241 is a side of the ventilation opening and air passes through the air guide side 241. The air guide side 241 is an arc concave face to efficiently lead air into the cooling pipe 20 to he mixed with the exhaust gas, so that heat is dissipated. The arc concave face is used as the air guide side 241 to alter the air flow direction so many times that the air flow speed is decreased and the exhaust gas could be mixed with the air sufficiently.

Figure 5:
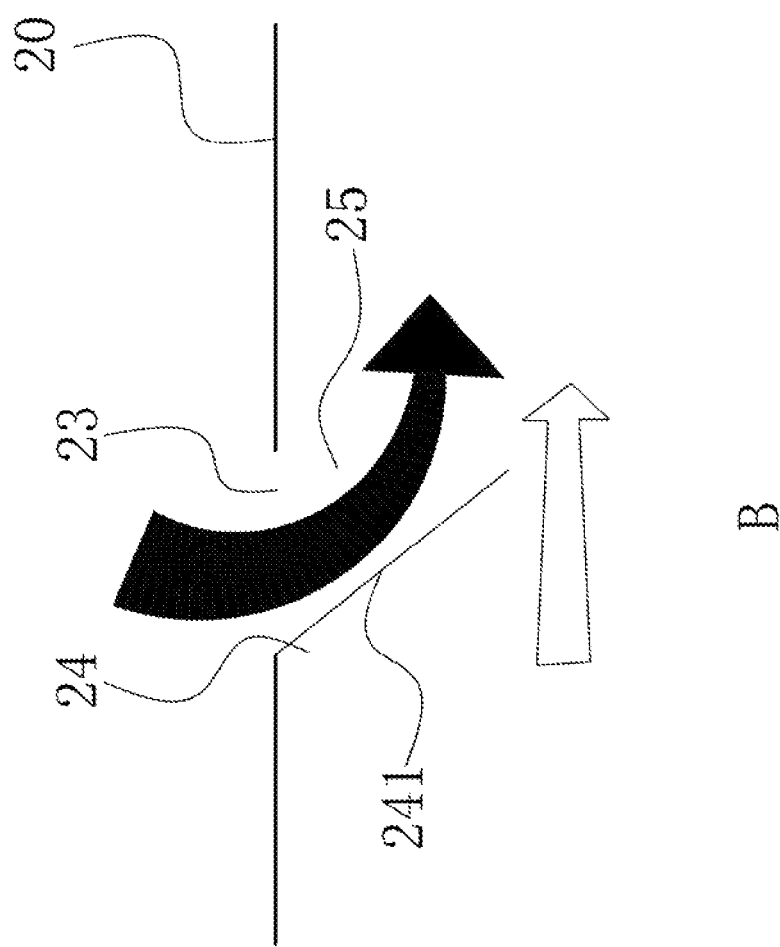
FIG. 5 is an enlarged view of the portion 13 of FIG. 3 in another form.

Referring to FIG. 5, the air deflector 24 is configured as a planar surface to lead air into the cooling pipe 20 to be mixed with the exhaust gas. Accordingly, heat is dissipated.

In a preferred embodiment, the casing 10 includes a connecting tail pipe 12 and a heat dissipative tail pipe 13. The cooling pipe 20 is fixedly connected with the connecting tail pipe 12 and inserted into the heat dissipative tail pipe 13.

The connecting tail pipe 12 receives exhaust gas and transfers the exhaust gas from the heat dissipative air inlet end 21 to the cooling pipe 20. The air within the heat dissipative pipe 13 is used a heat absorption layer and absorbs a part of heat. The air enters into the ventilation openings 25 through heat dissipative ventilation holes 23 and into the cooling pipe 20 to mix with the exhaust gas which exchanges heat with the air, so that the temperature is rapidly decreased. The mixture of exhaust gas and air is discharged from the heat dissipative air outlet end 22 of the cooling pipe 20 and then exits out of the casing 10.

Preferably, the cooling pipe 20, the connecting tail pipe 22 and the heat dissipative tail pipe 13 are all configured as a hollow clinder. The diameter of the connecting tail pipe 12 is smaller than that of the heat dissipative tail pipe 13.

The cooling pipe 20, the connecting tail pipe 22 and the heat dissipative tail pipe 13 could be of various shapes and preferably be of a hollow cylinder for ease of mounting.

The diameter of the connecting tail pipe 12 is smaller than that of the heat dissipative tail pipe 13. Consequently, a space is formed between the cooling pipe 20 and the heat dissipative tail pipe 13, which guarantees discharge of the exhaust gas out of the casing 10 and prevents the exhaust gas directly escaping out of the ventilation through holes 11 to cause danger. And the amount of air entering the casing 10 is significantly increased, which improves mixture of the exhaust gas with the air. When the exhaust gas transmits at a high speed within the cooling pipe 20, a huge attraction is formed to draw the air entering the casing 10 into the cooling pipe 20. The air and the exhaust gas mix with each other within the cooling pipe 20, so as to reduce the temperature of the gas within the cooling pipe 20.

Preferably, the end of the heat dissipative tail pipe 13 at the exhaustion direction is an oblique surface which could discharge the exhaust gas downward and provide a safer configuration.

In a preferred embodiment, the casing 10 further includes a connecting element 26 mounted between the connecting tail pipe 12 and the heat dissipative tail pipe 13. The connecting element 26 is configured as a round table. The ventilation through holes 11 are provided on the outer sidewall of the connecting element 26.

If the ventilation through holes 11 are disposed on the connecting tail pipe 12, the exhaust gas within the connecting tail pipe 12 will be leaked and the high temperature exhaust gas thus leaked would destroy the exhaustion pipe and the like. And if the ventilation through holes 11 are disposed on the heat dissipative tail pipe 13, a pail of the heat dissipative through holes 23 would fail and a large amount of air could not be absorbed, for which the cooling efficiency of the cooling pipe 20. The ventilation through holes 11 could be disposed on the connecting element 26 in such a manner that the exhaust gas will not be leaked and the cooling efficiency of the cooling pipe could be guaranteed.

The cooling pipe 20, the connecting tail pipe 12, the heat dissipative tail pipe 13 and the connecting element 26 are all coaxially disposed.

The cooling pipe 20 and the connecting tail pipe 12 are coaxially provided, so that the flow direction of the exhaust gas will be in the same direction to prevent the exhaust gas running unevenly to cause danger. The heat dissipative tail pipe 13 and the cooling pipe 20 are coaxially provided, so that the cooling pipe 20 will be mounted in the middle of the heat dissipative tail pipe 13 and the cooling pipe 20 has the same air layer thickness. Meanwhile, the air entering the cooling pipe 20 has substantially the same amount and is kept in a stable state within the cooling pipe 20, thereby providing a safer and better cooling effect.

The specific embodiments described herein are merely illustrative of the spirit of the invention. it is apparent to those skilled in the art that various modifications, amendments and alternatives can be made to these embodiments without departing from the spirit or scope defined by the appended claims.

LIST OF REFERENCE NUMERALS

10 Casing
11 Ventilation Through Hole
12 Connecting Tail Pipe
13 Heat Dissipative Tail Pipe
20 Cooling Pipe
21 Heat Dissipative Air Inlet End
22 Heat Dissipative Air Outlet End
23 Heat Dissipative Ventilation Hole
24 Air Deflector
241 Air Guide Side
25 Ventilation Opening
26 Connecting Element

The invention claimed is:

1. An exhaustion pipe, comprising:
a casing, on the sidewall of which a plurality of ventilation through holes are provided; and
a cooling pipe mounted within the housing, which includes a heat dissipative air inlet end and a heat dissipative air outlet end, and on the sidewall of which a plurality of heat dissipative ventilation holes are provided;
wherein
an edge of each of the heat dissipative ventilation holes extends to the interior of the cooling pipe to form an air deflector which forms a ventilation opening tosilether with the heat dissipative ventilation hole;
the air deflectors are fixedly connected with an arc edge of the heat dissipative ventilation holes; and
the air deflectors are tilted toward the heat dissipative air outlet end.

2. The exhaustion pipe as claimed in claim 1, wherein the heat dissipative ventilation holes are of a semi-circular shape.

3. The exhaustion pipe as claimed in claim 1, wherein each of the air deflectors includes an air guide side which is configured as an arc concave face.

4. The exhaustion pipe as claimed in claim 1, wherein the casing includes a connecting tail pipe and a heat dissipative tail pipe, and the cooling pipe is fixedly connected with the connecting tail pipe and inserted into the heat dissipative tail pipe.

5. The exhaustion pipe as claimed in claim 4, wherein the cooling pipe, the connecting tail pipe and the heat dissipative tail pipe are all configured as a hollow cylinder, and the diameter of the connecting tail pipe is smaller than that of the heat dissipative tail pipe.

6. The exhaustion pipe as claimed in claim 4, wherein the end of the heat dissipative tail pipe at the exhaustion direction is an oblique surface.

7. The exhaustion pipe as claimed in claim 4, wherein the casing further includes a connecting element mounted between the connecting tail pipe and the heat dissipative tail pipe, the connecting element is configured as a round table and the ventilation through holes are provided on the outer sidewall of the connecting element.

8. The exhaustion pipe as claimed in claim 7, wherein the cooling pipe, the connecting tail pipe, the heat dissipative tail pipe and the connecting element are all coaxially disposed.

* * * * *